(12) United States Patent
Raco

(10) Patent No.: US 6,659,487 B1
(45) Date of Patent: Dec. 9, 2003

(54) FLEXIBLE BIKE FRAME

(76) Inventor: Tony S. Raco, 1148 Conroy La., #22, Roseville, CA (US) 95661-4128

( * ) Notice: Subject to any disclaimer, the term of this patent is extended or adjusted under 35 U.S.C. 154(b) by 0 days.

(21) Appl. No.: 10/225,626

(22) Filed: Aug. 22, 2002

Related U.S. Application Data

(63) Continuation-in-part of application No. 10/051,026, filed on Jan. 18, 2002, now abandoned.

(51) Int. Cl.$^7$ .......................... B62K 15/00; B62K 19/00
(52) U.S. Cl. ........................ 280/275; 280/278; 280/287
(58) Field of Search ................................. 280/279, 287, 280/275, 283, 286, 278

(56) References Cited

U.S. PATENT DOCUMENTS

| | | |
|---|---|---|
| 424,870 A | 4/1890 | Fay |
| 467,695 A | 1/1892 | Warwick |
| 617,535 A | 1/1899 | Martin |
| 686,156 A | 11/1901 | Snyder |
| 687,216 A | 11/1901 | Foreman |
| 699,376 A | 5/1902 | Errick |
| 3,876,231 A | 4/1975 | Geisel |
| 4,842,292 A | 6/1989 | Wang |
| 5,149,119 A | 9/1992 | Hwang |
| 5,498,013 A | 3/1996 | Hwang |
| D390,506 S | 2/1998 | Shiau |
| 5,772,228 A | 6/1998 | Owyang |
| 5,797,613 A | 8/1998 | Busby |
| 5,997,022 A | 12/1999 | Matsui |

FOREIGN PATENT DOCUMENTS

| | | |
|---|---|---|
| EP | 82110580.6 | 5/1984 |
| EP | 91114666.0 | 2/1993 |

*Primary Examiner*—Anne Marie Boehler

(57) ABSTRACT

A flexible bike frame includes a top bar assembly, a lower bar assembly having a forward end connected to the top bar assembly and extending downwardly and rearwardly, and a seat bar assembly mounted on the rear end of the top bar assembly and extending downwardly from the top bar assembly toward the lower bar assembly. A shock reducing assembly reduces the amount of force transferred from a riding surface to a user. A plurality of joint assemblies are mounted on the frame for permitting changes in the distance between the ends of the top bar assembly. A first joint assembly is positioned between front and middle sections of the top bar assembly, a second joint assembly is positioned between middle and rear sections of the top bar assembly, and a third joint assembly is positioned on the lower bar assembly adjacent to the sprocket drive assembly.

10 Claims, 5 Drawing Sheets

FLEXIBLE BIKE FRAME

REFERENCE TO RELATED APPLICATION

This application is a continuation-in-part of application Ser. No. 10/051,026, filed Jan. 18, 2002 now abandoned.

BACKGROUND OF THE INVENTION

1. Field of the Invention

The present invention relates to bike frames and more particularly pertains to a new flexible bike frame for reducing the amount of force transferred to a user through the frame when the bicycle encounters rough terrain.

2. Description of the Prior Art

The use of bike frames is known in the prior art. U.S. Pat. No. 5,772,228 describes a device/system for providing a rear suspension system for a bicycle. Another type of bike frame is disclosed in U.S. Pat. No. 5,997,022 having a suspension assembly for a bicycle frame which elastically supports a rear frame which in turn supports the rear wheel.

While these devices fulfill their respective, particular objectives and requirements, the need remains for a device that includes improved features. The present invention has numerous, unique flexible members distributed about the frame to provide a smoother ride.

SUMMARY OF THE INVENTION

The present invention meets the needs presented above by providing a unique joint design in specific locations on the frame to provide increased flexibility in the frame.

Still yet another object of the present invention is to provide a new flexible bike frame that has a special seat apparatus which provides the user with a cushioned, shock-absorbing ride.

Even still another object of the present invention is to provide a new flexible bike frame that is simple in design for low maintenance.

To this, the present invention generally comprises a bike frame including a top bar assembly, a lower bar assembly having a forward end connected to the top bar assembly and extending downwardly and rearwardly, and a seat bar assembly mounted on the rear end of the top bar assembly and extending downwardly from the top bar assembly toward the lower bar assembly. A shock reducing assembly reduces the amount of force transferred from a riding surface to a user. A plurality of joint assemblies are mounted on the frame for permitting changes in the distance between the ends of the top bar assembly. A first joint assembly is positioned between front and middle sections of the top bar assembly, a second joint assembly is positioned between middle and rear sections of the top bar assembly, and a third joint assembly is positioned on the lower bar assembly adjacent to the sprocket drive assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
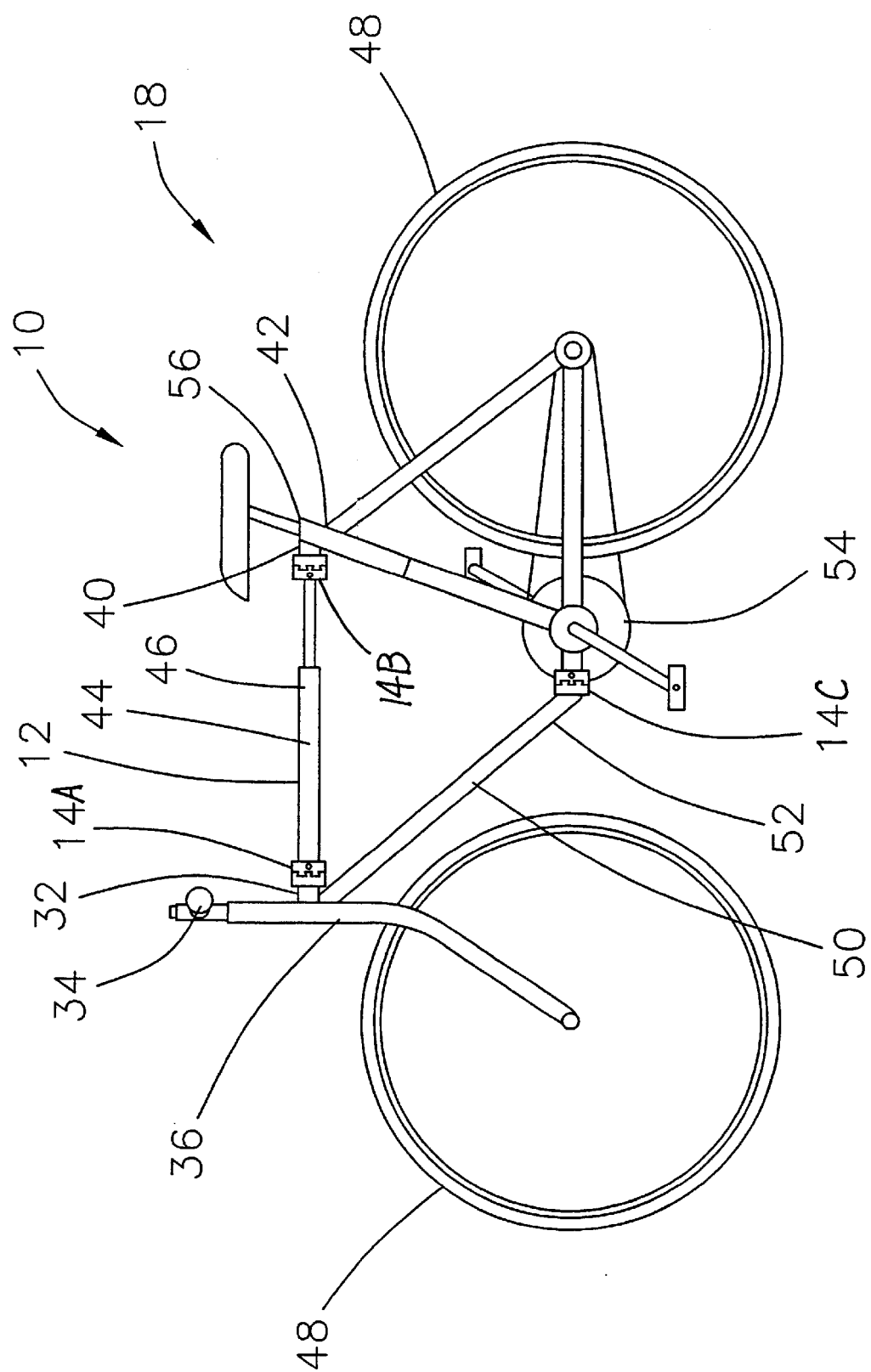
FIG. 1 is a schematic side view of a new flexible bike frame according to the present invention.

With reference now to the drawings, and in particular to FIGS. 1 through 5 thereof, a new flexible bike frame embodying the principles and concepts of the present invention and generally designated by the reference numeral 10 will be described.

Figure 2:
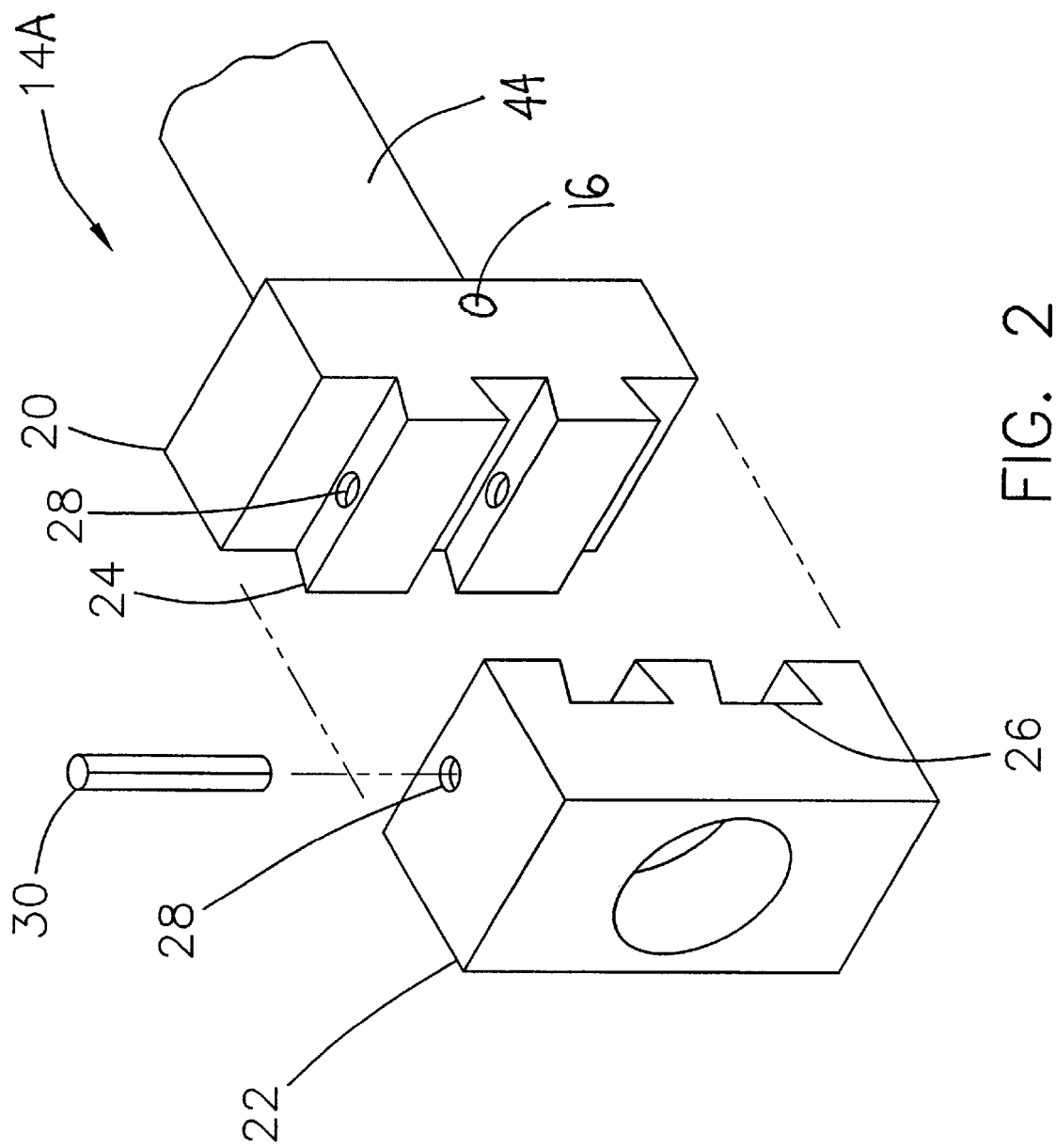
FIG. 2 is a schematic side view of the top horizontal bar of the present invention.
Figure 3:
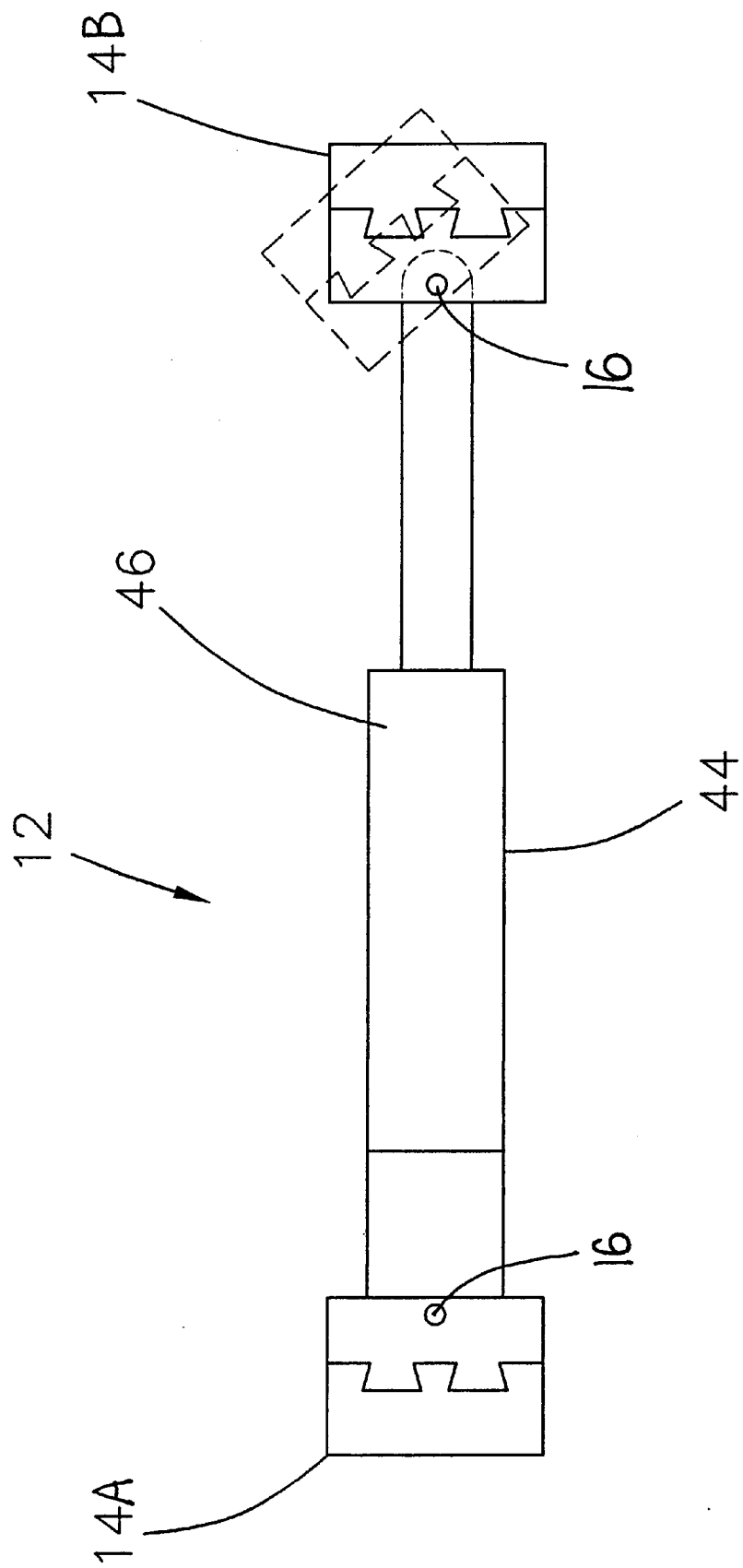
FIG. 3 is a schematic perspective view of the joint member of the present invention.
Figure 4:
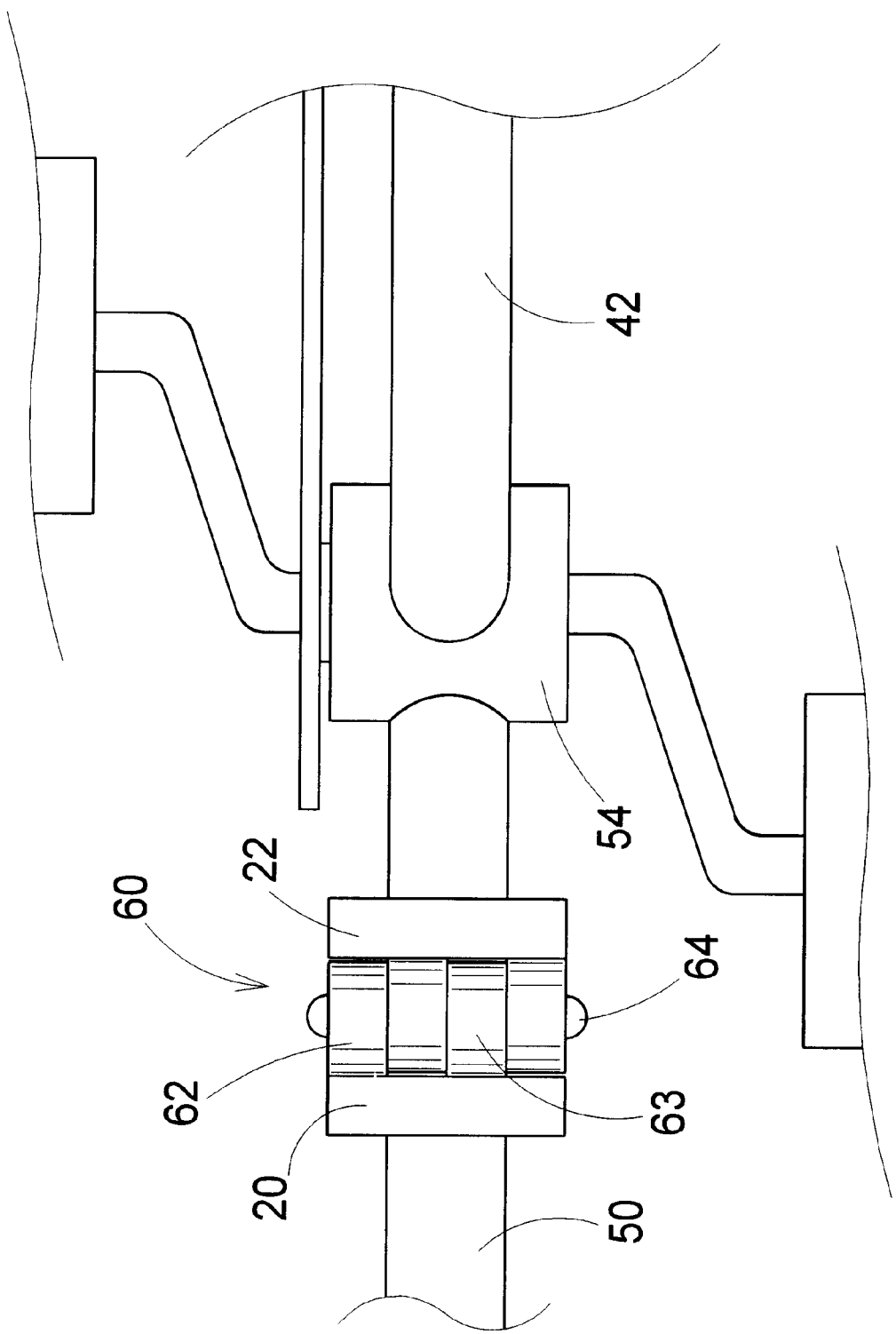
FIG. 4 is a schematic top view of the lower portion of a frame having an option joint configuration.
Figure 5:
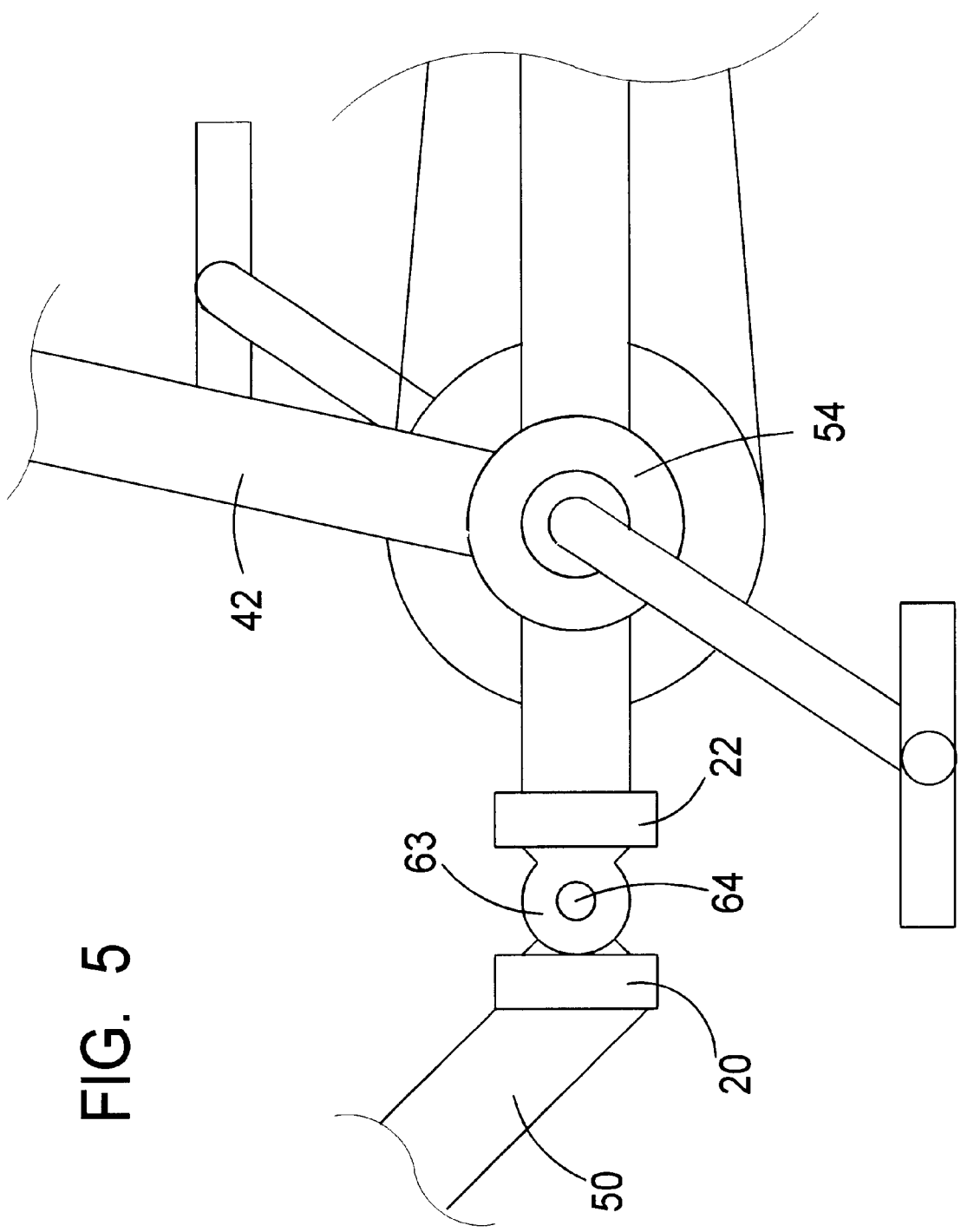
FIG. 5 is a schematic side view of the optional joint configuration of FIG. 4.

As best illustrated in FIGS. 1 through 3, the invention contemplates a bicycle 18 with a flexible bike frame 10, front and rear wheels 48 mounted on the frame 10, handlebars 38 rotatably mounted on the frame for steering the front wheel, a sprocket drive assembly 54 rotatably mounted on the frame, and a seat 56 that is mounted on the frame for the user to sit on.

The frame 10 of the invention preferably comprises a top bar assembly 12 having a front end and a rear end, and a front 32, a middle 44, and a rear section 40. The frame also comprises a lower bar assembly 50 having a forward end connected to the front end of the top bar assembly (or the steering bar 36 on which the handlebars 34 are mounted), and the lower bar assembly extends downwardly and rearwardly from the front end of the top bar assembly. The lower bar assembly 50 also has a rearward end opposite the forward end. The frame 10 may also comprise a seat bar assembly 42 mounted on the rearward end of the top bar assembly and extending downwardly from the top tube assembly 12 toward the rearward end of the lower bar assembly 50.

The invention also may include shock reducing means for reducing the amount of force transferred from a riding surface to a user through the frame 10 when the bicycle encounters rough riding surfaces. In one embodiment of the invention, the shock reducing means comprises a shock absorber assembly 46 forming the middle section 44 of the top bar assembly 12. The shock absorber assembly 46 has opposite ends with a distance between the ends being variable. The shock absorber assembly 46 may include resistance means for resisting changes in the distance between the ends of the shock absorber assembly, as is conventional in shock absorbers which employ, for example, fluid movement in chambers or springs to resist telescopic movement of the shock absorber assembly. For example, the shock absorber assembly 46 may comprise a cylinder member and a ram member slidably received in the cylinder member, although other shock absorbing structures may be employed.

The invention may also includes a plurality of joint assemblies mounted on the frame for permitting extending and reducing of the distance between the ends of the top bar assembly for accommodating the extension and contraction of the shock absorber assembly. In one embodiment of the invention, the plurality of joint assemblies comprise a first one 14A of the joint assemblies that is positioned between the front and middle sections of the top bar assembly for increasing flexibility in the frame near an upper front section of the frame. The first joint assembly 14A may be pivotally mounted to the middle section (and shock absorber) of the top bar assembly. The first joint assembly 14A may be pivotally mounted to the middle section by a pivot pin 16 that permits pivot movement of the middle section 44 (and the shock absorber 46) with respect to the first joint assembly 14A.

A second one 14B of the joint assemblies may be positioned between the middle 44 and rear 40 sections of the top bar assembly 12 for increasing flexibility in the frame near the seat. The second joint assembly 14B is pivotally mounted to the middle section of the top bar assembly 12, and may be pivotally mounted to the middle section by a pivot pin 16 that permits pivot movement of the middle section with respect to the second joint assembly.

A third one 14C of the joint assemblies may be positioned on the lower bar assembly 50 adjacent to the sprocket drive assembly 54 for increasing flexibility of the frame between the lower bar assembly and the seat bar assembly 42. The third joint assembly 14C may be pivotally mounted to the sprocket drive assembly 54. The third joint assembly may be pivotally mounted to the sprocket drive assembly by a pivot pin 16 that permits pivot movement of the sprocket drive assembly with respect to the third joint assembly.

Each of the joint assemblies 14 may comprise a first portion 22 and a second portion 20, which may be connected together by connecting means for removably connecting the first and second portions together. The connecting means may include a plurality of alternating tenons 26 and mortises 24 formed on the first portion 22, and a plurality of alternating tenons 26 and mortises 24 are formed on the second portion 20. The mortises of the second portion are slidably insertable into the tenons of the first portion and the mortises of the second portion being slidably insertable into the tenons of the second portion. In one embodiment of the invention, the tenons and mortises of the first and second portions have a complementary dovetail shape.

The joint assemblies 14 may also include securing means for securing the first 22 and second 20 portions together against sliding with respect to each other. The securing means may comprise a bore 28 formed through at least one of the mortises on the first portion and at least one of the mortises on the second portion. The bore 28 in the mortise of the first portion may be aligned with the bore in the mortise of the second portion when the mortises of the first portion and the mortises of the second portion are engaged such that the bore may removably receive a pin. The bores 28 may be oriented substantially perpendicular to longitudinal axes of the mortises of the first and second portions. A pin 30 may be removably inserted into the bores 28 of the mortises of the first portion and the mortises of the second portion for preventing sliding of the mortises with respect to each other.

In an optional joint assembly configuration 60 of the invention (see FIGS. 4 and 5), the first and second portions of the joint assembly each have a plurality of knuckles 62, 63 that may be tubular and substantially tubular. The knuckles 62, 63 of each of the first and second portions are spaced from each other to create gaps into which the knuckles of the other of the portions may be positioned to form a substantially continuous barrel with a channel through which a shaft 64 may be positioned. The optional joint assembly configuration 60 permits the same pivoting of the bar assemblies as the first embodiment of the joint assembly, but does not employ the dovetail structure.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A bicycle frame comprising:
   a top bar assembly having a front end and a rear end, the top bar assembly having a front, a middle, and a rear section;
   a lower bar assembly having a forward end connected to the front end of the top bar assembly and extending downwardly and rearwardly from the front end of the top bar assembly, the lower bar assembly having a rearward end opposite the forward end;
   a seat bar assembly mounted on the rearward end of the top bar assembly and extending downwardly from the top bar assembly toward the rearward end of the lower bar assembly;
   shock reducing means for reducing the amount of force transferred from a riding surface to a user through the frame when the bicycle encounters rough riding surfaces; and
   a plurality of joint assemblies mounted on the frame for permitting extending and reducing of the distance between the ends of the top bar assembly,
   wherein each of the joint assemblies comprises a first portion and a second portion, and connecting means for removably connecting the first and second portions together, the connecting means comprising:
     a plurality of alternating tenons and mortises formed on the first portion and a plurality of alternating tenons and mortises formed on the second portion;
     wherein the mortises of the second portion are slidably insertable into the tenons of the first portion and the mortises of the first portion being slidably insertable into the tenons of the second portion.

2. The frame of claim 1 wherein the plurality of joint assemblies comprise:
   a first one of the joint assemblies being positioned between the front and middle sections of the top bar assembly for increasing flexibility in the frame near an upper front section of the frame, the first joint assembly being pivotally mounted to the middle section of the top bar assembly;
   a second one of the joint assemblies being positioned between the middle and rear sections of the top bar assembly for increasing flexibility in the frame near the seat, the second joint assembly being pivotally mounted to the middle section of the top bar assembly; and
   a third one of the Joint assemblies being positioned on the lower bar assembly adjacent to the sprocket drive assembly for increasing flexibility of the frame between the lower bar assembly and the seat bar assembly, the third joint assembly being pivotally mounted to the sprocket drive assembly; and wherein the first joint assembly is pivotally mounted to the middle section by a pivot pin permitting pivot movement of the middle section with respect to the first joint assembly, the second joint assembly being pivotally mounted to the middle section by a pivot pin permitting pivot movement of the middle section with respect to the second joint assembly, and the third joint assembly being pivotally mounted to the sprocket drive assembly by a pivot pin permitting pivot movement of the sprocket drive assembly with respect to the third joint assembly.

3. The frame of claim 1 wherein the shock reducing means comprises a shock absorber assembly forming the middle section of the top bar assembly, the shock absorber assembly having opposite ends with a distance between the ends being variable.

4. The frame of claim 3 wherein the shock absorber assembly includes resistance means for resisting changes in the distance between the ends of the shock absorber assembly.

5. The frame of claim 4 wherein the shock absorber assembly comprises a cylinder member and a ram member slidably received in the cylinder member.

6. The frame of claim 1 wherein each of the joint assemblies comprises securing means for securing the first and second portions together against sliding with respect to each other.

7. A bicycle frame comprising:
a top bar assembly having a front end and a rear end, the top bar assembly having a front, a middle, and a rear section;
a lower bar assembly having a forward end connected to the front end of the top bar assembly and extending downwardly and rearwardly from the front end of the top bar assembly, the lower bar assembly having a rearward end opposite the forward end;
a seat bar assembly mounted on the rearward end of the top bar assembly and extending downwardly from the top bar assembly toward the rearward end of the lower bar assembly;
shock reducing means for reducing the amount of force transferred from a riding surface to a user through the frame when the bicycle encounters rough riding surfaces; and
a plurality of joint assemblies mounted on the frame for permitting extending and reducing of the distance between the ends of the top bar assembly, the plurality of joint assemblies comprising:
a first one of the joint assemblies being positioned between the front and middle sections of the top bar assembly for increasing flexibility in the frame near an upper front section of the frame, the first joint assembly being pivotally mounted to the middle section of the top bar assembly;
a second one of the joint assemblies being positioned between the middle and rear sections of the top bar assembly for increasing flexibility in the frame near the seat, the second joint assembly being pivotally mounted to the middle section of the top bar assembly; and
a third one of the joint assemblies being positioned on the lower bar assembly adjacent to the sprocket drive assembly for increasing flexibility of the frame between the lower bar assembly and the seat bar assembly, the third joint assembly being pivotally mounted to the sprocket drive assembly;

wherein each of the joint assemblies comprises a first portion and a second portion, and connecting means for removably connecting the first and second portions together; and wherein the connecting means comprises
a plurality of alternating tenons and mortises formed on the first portion and a plurality of alternating tenons and mortises formed on the second portion;
wherein the mortises of the second portion are slidably insertable into the tenons of the first portion and the mortises of the first portion being slidably insertable into the tenons of the second portion.

8. The frame of claim 7 wherein the tenons and mortises of the first and second portions have a complementary dovetail shape.

9. The frame of claim 7 wherein each of the joint assemblies comprises securing means for securing the first and second portions together against sliding with respect to each other, and wherein the securing means comprises:
a bore formed through at least one of the mortises on the first portion and at least one of the mortises on the second portion, the bore in the at least one mortise of the first portion being alignable with the bore in the at least one mortise of the second portion when the mortises of the first portion and the mortises of the second portion are engaged for removably receiving a pin, the bores being oriented substantially perpendicular to longitudinal axes of the mortises of the first and second portions; and
a pin removably inserted into the bores of the at least one mortise of the first portion and the at least one mortise of the second portion for preventing sliding of the mortises with respect to each other.

10. A bicycle comprising:
a frame;
front and rear wheels mounted on the frame;
handlebars rotatably mounted on the frame for steering the front wheel;
a sprocket drive assembly rotatably mounted on the frame;
a seat mounted on the frame for the user to sit on;
wherein the frame comprises:
a top bar assembly having a front end and a rear end, the top bar assembly having a front, a middle, and a rear section;
a lower bar assembly having a forward end connected to the front end of the top bar and extending downwardly and rearwardly from the front end of the top bar, the lower bar assembly having a rearward end opposite the forward end;
a seat bar assembly mounted on the rearward end of the top bar assembly and extending downwardly from the top tube assembly toward the rearward end of the lower bar assembly;
shock reducing means for reducing the amount of force transferred from a riding surface to a user through the frame when the bicycle encounters rough riding surfaces, the shock reducing means comprising:
a shock absorber assembly forming the middle section of the top bar assembly, the shock absorber assembly having opposite ends with a distance between the ends being variable, the shock absorber assembly including resistance means for resisting changes in the distance between the ends of the shock absorber assembly, the shock absorber assembly comprising a cylinder member and a ram member slidably received in the cylinder member;

a plurality of joint assemblies mounted on the frame for permitting extending and reducing of the distance between the ends of the top bar assembly, lower bar assembly, and the seat bar assembly with respect to each other to decrease rigidity of the frame, the plurality of joint assemblies comprising:

a first one of the joint assemblies being positioned between the front and middle sections of the top bar assembly for increasing flexibility in the frame near an upper front section of the frame, the first joint assembly being pivotally mounted to the middle section of the top bar assembly, the first joint assembly being pivotally mounted to the middle section by a pivot pin permitting pivot movement of the middle section with respect to the first joint assembly;

a second one of the joint assemblies being positioned between the middle and rear sections of the top bar assembly for increasing flexibility in the frame near the seat, the second joint assembly being pivotally mounted to the middle section of the top bar assembly, the second joint assembly being pivotally mounted to the middle section by a pivot pin permitting pivot movement of the middle section with respect to the second joint assembly;

a third of the joint assemblies being positioned on the lower bar assembly adjacent to the sprocket drive assembly for increasing flexibility of the frame between the lower bar assembly and the seat bar assembly, the third joint assembly being pivotally mounted to the sprocket drive assembly, the third joint assembly being pivotally mounted to the sprocket drive assembly by a pivot pin permitting pivot movement of the sprocket drive assembly with respect to the third joint assembly; wherein each of the joint assemblies comprises:

a first portion and a second portion;

connecting means for removably connecting the first and second portions together, the connecting means comprising:

a plurality of alternating tenons and mortises formed on the first portion; and a plurality of alternating tenons and mortises formed on the second portion;

wherein the mortises of the second portion are slidably insertable into the tenons of the first portion and the mortises of the first portion being slidably insertable into the tenons of the second portion;

wherein the tenons and mortises of the first and second portions have a complementary dovetail shape;

securing means for securing the first and second portions together against sliding with respect to each other, the securing means comprising:

a bore formed through at least one of the mortises on the first portion and at least one of the mortises on the second portion, the bore in the at least one mortise of the first portion being alignable with the bore in the at least one mortise of the second portion when the mortises of the first portion and the mortises of the second portion are engaged for removably receiving a pin, the bores being oriented substantially perpendicular to longitudinal axes of the mortises of the first and second portions; and a pin removably inserted into the bores of the at least one mortise of the first portion and the at least one mortise of the second portion for preventing sliding of the mortises with respect to each other.

* * * * *